United States Patent
Casati et al.

(10) Patent No.: US 7,228,328 B2
(45) Date of Patent: Jun. 5, 2007

(54) MULTINODE ACTIVATION AND TERMINATION METHOD AND SYSTEM

(75) Inventors: Fabio Casati, Palo Alto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 956 days.

(21) Appl. No.: 09/872,581

(22) Filed: May 31, 2001

(65) Prior Publication Data
US 2002/0194257 A1   Dec. 19, 2002

(51) Int. Cl.
*G06F 15/16* (2006.01)
*G06F 9/46* (2006.01)

(52) U.S. Cl. ............ 709/203; 709/201; 709/205; 705/8

(58) Field of Classification Search ............ 707/10; 725/1
See application file for complete search history.

(56) References Cited

U.S. PATENT DOCUMENTS

| | | | |
|---|---|---|---|
| 5,179,633 A * | 1/1993 | Barabash et al. | 706/48 |
| 5,951,683 A * | 9/1999 | Yuuki et al. | 713/1 |
| 6,041,306 A * | 3/2000 | Du et al. | 705/8 |
| 6,041,376 A * | 3/2000 | Gilbert et al. | 710/108 |
| 6,088,679 A * | 7/2000 | Barkley | 705/8 |
| 6,220,768 B1 * | 4/2001 | Barroux | 709/224 |
| 6,578,010 B1 * | 6/2003 | Teacherson | 705/14 |
| 2002/0083166 A1* | 6/2002 | Dugan et al. | 709/223 |
| 2004/0078373 A1* | 4/2004 | Ghoneimy et al. | 707/10 |

OTHER PUBLICATIONS

Ohi et al, Parallel Instance Discrete-event Simulation Using a Vector Uniprocessor, IEEE Computer Society, 1991, pp. 593-601.*

* cited by examiner

*Primary Examiner*—Bunjob Jaroenchonwanit
*Assistant Examiner*—Kenny Lin

(57) ABSTRACT

A multinode activation and termination method and system A method and system is provided for invoking multiple parallel instances of the same node. First, a multinode is defined that allows for multiple parallel activation of the node. At run time, a determination is made of the number of nodes to be activated based on an activation rule. The multinodes are then executed. Each multinode can be provided with different input data for execution, thereby allowing one to fine tune the input and attributes of each node. A termination rule is utilized to determine when the execution of the multinode is completed. When the execution of the multinode is complete, a successor node is then executed. When the execution of the multinode is not complete, processing continues on the multinode.

24 Claims, 6 Drawing Sheets

MULTINODE ACTIVATION AND TERMINATION METHOD AND SYSTEM

FIELD OF THE INVENTION

The present invention relates generally to electronic business technology, and more particularly, to business process automation and to a multinode activation and termination method and system.

BACKGROUND OF THE INVENTION

Workflow management is a rapidly evolving technology that many businesses in a variety of industries utilize to handle business processes. A business process, as defined by the Workflow standard—Terminology & glossary, Technical Report WFMC-TC-1011, Worflow Management Coalition, June 1996. Versions 2.0., is simply a set of one or more linked activities that collectively realize a business objective or a policy goal, typically within the context of an organizational structure defining functional roles and relationships. A workflow is defined as the automation of a business process, in whole or in part, during which documents, information, or activities are passed from one participant to another, according to a set of predefined rules. A workflow management system (WfMS) defines, creates, and manages the execution of workflows.

Examples of workflow software include BusinessWare software, available from Vitria Technology, Inc. of Sunnyvale, Calif., Inconcert software, available from TIBCO Software, Inc. of Palo Alto, Calif., MQ Series software, available from International Business Machines Corporation (IBM), of Armonk, N.Y., and Staffware 2000, available from Staffware of Berkshire, United Kingdom.

There are hundreds of commercial workflow management systems (WfMSs), which are available on the market, as well as many research prototypes. While each system has a different process model, most of them share the same basic concepts. In one example, a process is described by a directed graph that has four different kinds of nodes.

Work nodes (also called service nodes) represent the invocation of activities (also called services), which are assigned for execution to a human or automated resource. Route nodes are decision points that route the execution flow among nodes based on an associated routing rule. Start nodes denote the entry point to the process. Typically, only one start node is allowed in a process. Complete nodes denote termination points.

There are many business processes in which an activity needs to be executed multiple times in parallel. For example, a restaurant brokering service may need to request the rates and availability from several restaurants that provide on-line access to this type of information. The request node that requests rates and availability may need to be repeated for all the restaurants that meet a particular criteria (e.g., in a particular vicinity).

In some of these applications, the exact number of activations for the node is known at the time when the process definition is created. For example, in a small town, the number of restaurants may be relatively static. However, there are other applications where the exact number of parallel activations is not known at the time when the process definition is generated. For example, in a large metropolitan area, the number of restaurants may vary widely since many restaurants may open for business or close for business on any given day.

To model such a business process with traditional process models, the process developer is required to employ very complex process definitions to attempt to account for all the possible cases. For example, the developer may "guess" a maximum number of parallel activities that need to be activated in executions of the business process. In the example above, a process developer may assume that there will be at most twenty (20) restaurants. The developer then models a corresponding number of nodes in the workflow definition. FIG. 7 illustrates an exemplary process definition that has a request node for each of the twenty restaurants. Unfortunately, these complex process definitions are difficult to specify and even more difficult to maintain. Furthermore, this approach is limited since when there are more restaurants than the assumed maximum number (e.g., a number greater than twenty in this case), there is no provision in the process definition to handle such a case.

Some prior art approaches allow the multiple activation of services for each node, where the number of instances is based on the number of available resources. The Process Manager product available from Hewlett-Packard (HP) of Palo Alto, Calif., the assignee of the present invention, is an example of such an approach. In this approach, multiple activities can be executed in parallel within a work node. However, it is noted that the number of activities that are executed in parallel is always equal to the number of resources that are available for execution of that activity. In other words, no other criteria for the selection of the number of parallel activations are possible.

Furthermore, each activity is assigned to a different resource. Also, all the activities have the same input data. Moreover, the attributes of the node (e.g., the service selection, resource selection, security, exception handling specification) are the same for every activity execution within the work node. As can be appreciated, such a solution lacks flexibility. In fact, it would instead be desirable to have different resource selection criteria, different data, and different security and exception handling criteria depending on the purpose of the activity execution.

Consequently, it would be desirable to have a mechanism that allows for multiple executions, where the input can be varied for each execution, and the attributes of the execution can be varied for each execution, thereby providing a flexible solution.

Based on the foregoing, there remains a need for a multinode method and system having activation rules and termination rules that overcomes the disadvantages set forth previously.

SUMMARY OF THE INVENTION

According to one embodiment of the present invention, a method and system for processing workflows having at least one multinode (also referred to herein as a multi-service node) is described.

One aspect of the present invention is the provision of resource-based multinode acitvation rules.

Another aspect of the present invention is the provision of variable-based multinode acitvation rules.

Another aspect of the present invention is the provision of multinode termination conditions, where all nodes in the multinode must complete processing before processing for the multinode is terminated.

Another aspect of the present invention is the provision of termination conditions where less than all the nodes need to complete processing before processing for the multinode is terminated.

According to one embodiment, a multinode activation and termination method and system is provided for allowing multiple parallel instances of a same node to be invoked. First, a multinode is defined that allows for multiple parallel activation of a work node. At run time, a determination is made of the number of work nodes to be activated based on an activation rule. The work nodes are then executed. Each work node can be provided with different input data for execution, thereby allowing one to fine tune the input and attributes of each work node. A termination rule is utilized to determine when the execution of the multinode is completed. When the execution of the multinode is complete, a successor node is then executed. When the execution of the multinode is not complete, processing continues within the multinode.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

A method and system for multinode activation and termination are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Architecture 100

Figure 1:
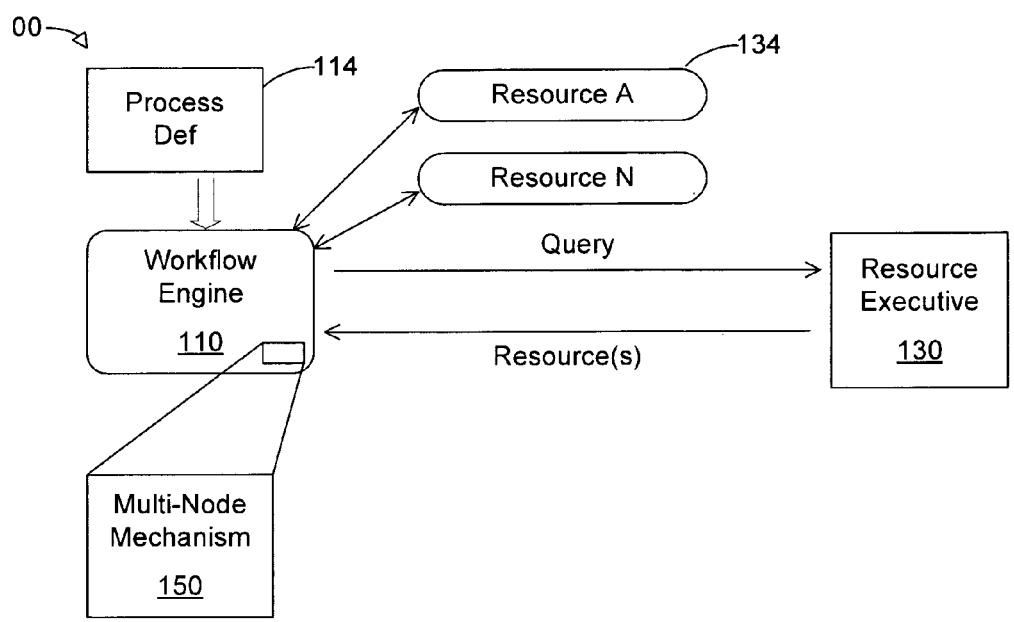
FIG. 1 illustrates an architecture for processing nodes according to one embodiment of the present invention can be utilized.

FIG. 1 illustrates an architecture 100 for processing multinodes according to one embodiment of the present invention. The architecture 100 includes a workflow engine 110 that can, for example, be an application that executes on a processor. The workflow engine 110 retrieves a process definition 114 (e.g., a flowchart). The workflow engine 110 then determines the first work node to execute. Next, the workflow engine 110 determines (e.g., reads) an activity corresponding to the first work node.

Then, the workflow engine 110 determines a resource rule corresponding to the activity. Preferably, the workflow engine 110 queries a resource executive 130 (e.g., the Process Manager product available from Hewlett-Packard (HP) of Palo Alto, Calif., the assignee of the present invention) to obtain a single resource or list of resources. An example of a single resource is the name of an individual in the organization, who is responsible for performing the activity. An example of a list of resources is a list of names of individuals in the organization, who are responsible for performing the activity.

Once the workflow engine 110 receives the list of resources, the workflow engine 110 assigns the activity to a particular resource 134 (e.g., resourceA, . . . , resourceN). When the resource 134 completes the activity, the resource 134 notifies the workflow engine 110 of completion. The workflow engine 110 then retrieves the process definition 114 to determine the next node in the workflow for processing. The next work node is then processed in a manner similar to the first work node. This process is repeated for all work nodes until the all nodes in the workflow are processed.

The workflow engine 110 can include a multinode mechanism 150 for processing multinodes. It is noted that the multinode mechanism 150 is preferably implemented as part of the workflow engine 110 (e.g., incorporated in the workflow engine 110). Alternatively, the multinode mechanism 150 can be implemented as a module that is separate from the workflow engine 110. In this case, the multinode mechanism 150 communicates with the workflow engine 110, but is not part of the workflow engine 110.

The multinode mechanism 150 (also referred to herein as a multinode handling facility) handles activation of the multinode and termination of the multinode. In one embodiment, the multinode mechanism 150 determines the number of nodes in the multinode to be activated based on an activation rule, executes the nodes in the multinode; determines when the execution of the multinode is completed based on a termination rule, and when the execution of the multinode is complete, executing a successor node. The multinode mechanism 150 is described in greater detail hereinafter with reference to FIG. 2.

Multinode Mechanism 150

Figure 2:
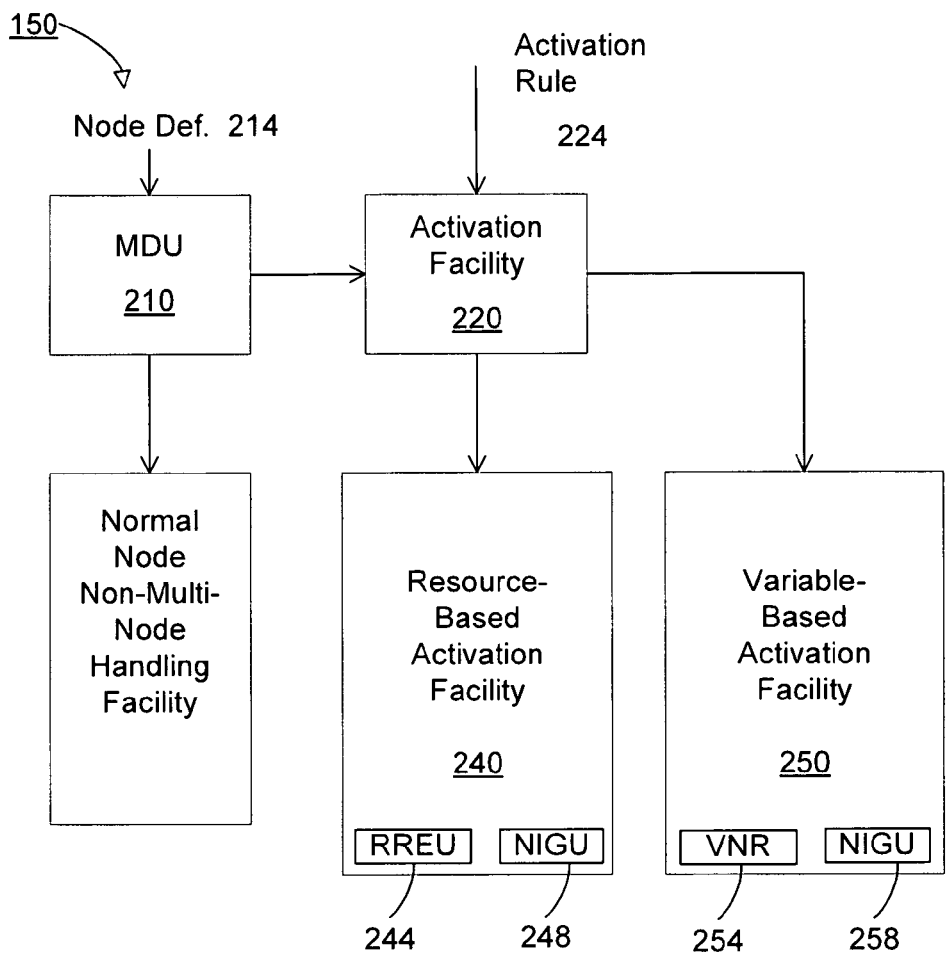
FIG. 2 is a block diagram of a multi-service node mechanism according to one embodiment of the present invention.

FIG. 2 is a block diagram of a multinode mechanism 150 according to one embodiment of the present invention. The multinode mechanism 150 includes a multinode determination unit (MDU) 210 for receiving a node definition 214 and determining whether the current node is a normal work node or a multinode. The multinode mechanism 150 also includes an activation facility 220 for receiving an activation rule 224 and based thereon for determining whether activation is by resource (resource-based activation) or by variable (variable-based activation).

The multinode mechanism 150 also includes a resource-based activation facility 240 for processing activation by resource and a variable-based activation facility 250 for processing activation by variable.

The resource-based activation facility 240 includes a resource rule execution unit (RREU) 244 for executing the resource rule of the multinode. For example, the resource rule may be specified in a service node tag of the multinode description. The resource-based activation facility 240 further includes a new instance generation unit (NIGU) 248 for starting new instances of the multinode for each new resource in the resource list.

The variable-based activation facility 250 includes a variable name reader 254 for reading the variable name V. For example, variable V may be of type vector or list. The variable-based activation facility 250 further includes a new instance generation unit (NIGU) 258 for starting new instances of the multinode for each new element in the vector or list identified by the variable name.

Multi-Service Node Activation Processing

Figure 3:
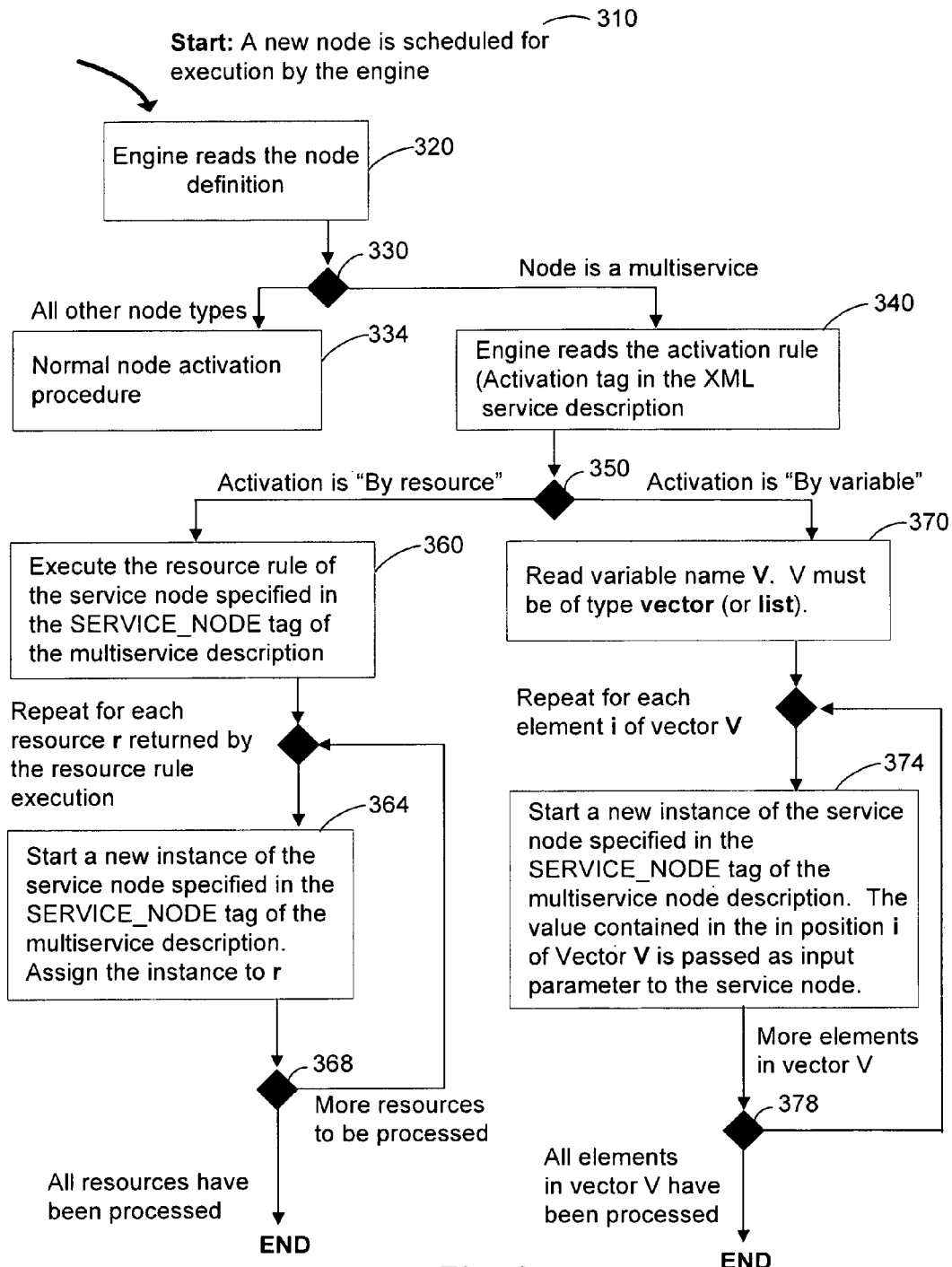
FIG. 3 is a flow chart illustrating the processing steps related to multi-service node activation that are performed by the multi-service node mechanism of FIG. 2 in accordance with one embodiment of the present invention.

FIG. 3 is a flow chart illustrating the processing steps related to multi-service node activation that are performed by the multi-service node mechanism of FIG. 2 in accordance with one embodiment of the present invention. In step 310, a new node is scheduled for execution by the workflow engine 110. In step 320, the workflow engine 110 reads the node definition. In decision block 330, a determination is made based on the node definition whether the current node is a multi-service node or a non-multi-service node.

When the current node is a multi-service node, processing proceeds to processing step 340. When the current node is not a multi-service node, processing proceeds to processing step 334, where normal node activation occurs. Normal node activation procedure is well-known to those of ordinary skill in the art and is not discussed further herein.

In step 340, the workflow engine 110 reads the activation rule. The activation rule can, for example, be specified by an activation tag in a mark-up language (e.g., XML) service description. In decision block 350, a determination is made whether the activation is by resource (i.e., resource-based activation) or by variable (i.e., variable-based activation).

In step 360, the workflow engine 110 executes the resource rule of the service node as specified in the SERVICE_NODE tag of the multi-service description. In step 364, the workflow engine 110 starts a new instance of the service node as specified in the SERVICE_NODE tag of the multi-service description. The new instance is assigned to the current resource. In decision block 368, a determination is made whether there are more resources to which a new instance of a service node should be assigned. In other words, the decision block determines whether all resources have been processed. When all resources have been processed, processing ends. When there are more resources to be processed, processing proceeds to step 364. It is noted that steps 364 and 368 are repeated for each resource r returned by the resource rule execution. Hence, in this case the number of service nodes activated is equal to the number of available resources for executing the node.

In step 370, the workflow engine 110 reads the variable name V. The variable name V can be, for example, of type vector or list. In step 374, the workflow engine 110 starts a new instance of the service node as specified in the SERVICE_NODE tag of the multi-service description. The value contained in the position i of vector V is passed as an input parameter to the service node.

In decision block 378, a determination is made whether there are more elements in vector V to be processed. In other words, the decision block determines whether all elements in vector V have been processed. When all elements in vector V have been processed, the processing ends. When there are more elements to be processed, processing proceeds to step 374. It is noted that steps 374 and 378 are repeated for each element i in vector V.

Multi-Service Node Termination Processing

Figure 4:
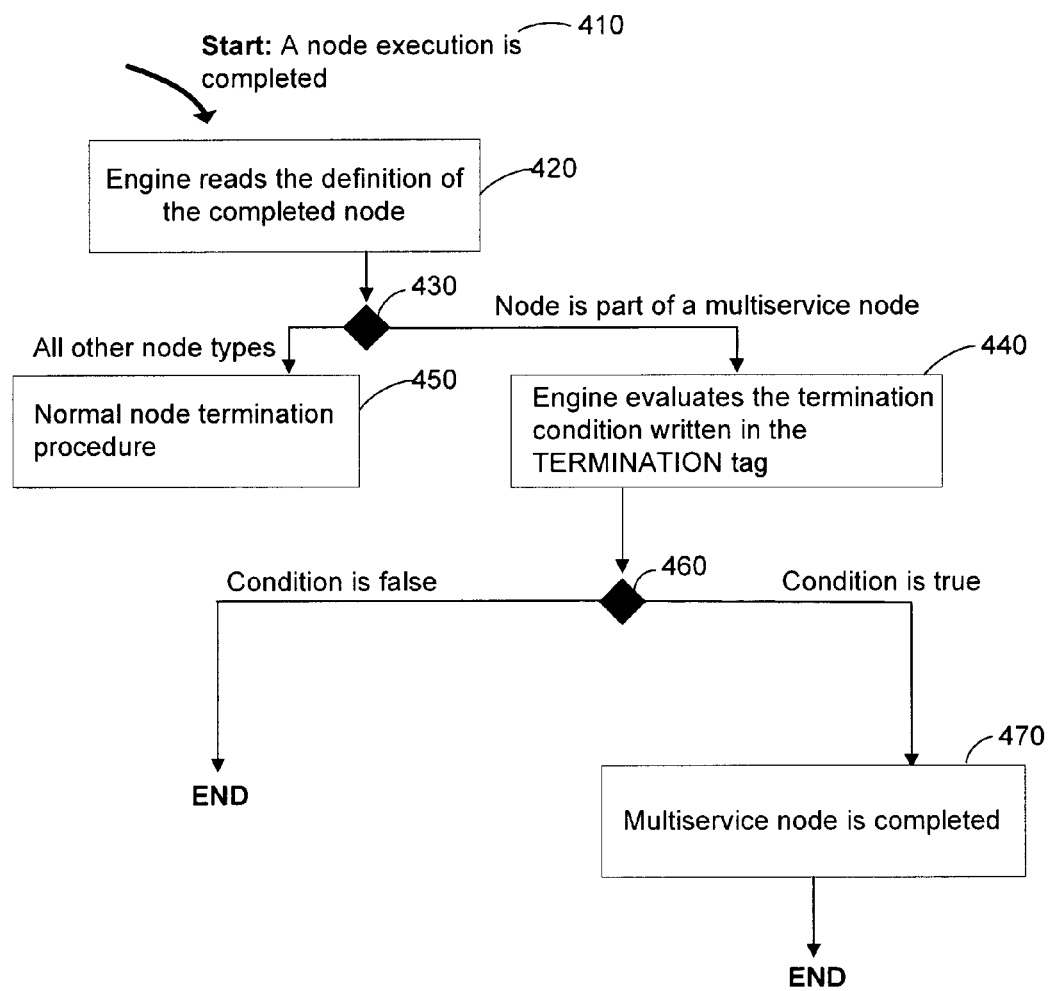
FIG. 4 is a flow chart illustrating the processing steps related to multi-service node termination that are performed by the multi-service node mechanism of FIG. 2 in accordance with one embodiment of the present invention.

FIG. 4 is a flow chart illustrating the processing steps related to multi-service node termination that are performed by the multi-service node mechanism of FIG. 2 in accordance with one embodiment of the present invention. In step 410, the execution of a node is completed. In step 420, the workflow engine 110 reads a definition of the completed node. In decision block 430, a determination is made whether the node is part of a multi-service node.

When the current node is part of a multi-service node, processing proceeds to processing step 440. When the current node is not part of a multi-service node, processing proceeds to processing step 450, where normal node termination occurs. Normal node termination procedure is well-known to those of ordinary skill in the art and is not discussed further herein.

In step 440, the workflow engine 110 evaluates the termination condition that is specified in the TERMINATION tag. In decision block 460, a determination is made whether the termination condition is true. When the termination condition is true, in step 470, the multi-service node is completed. Otherwise, when the termination condition is false, the multi-service node is not completed, and processing ends (i.e., the multiservice node continues to execute).

Exemplary Restaurant Reservation Workflow

Figure 5:
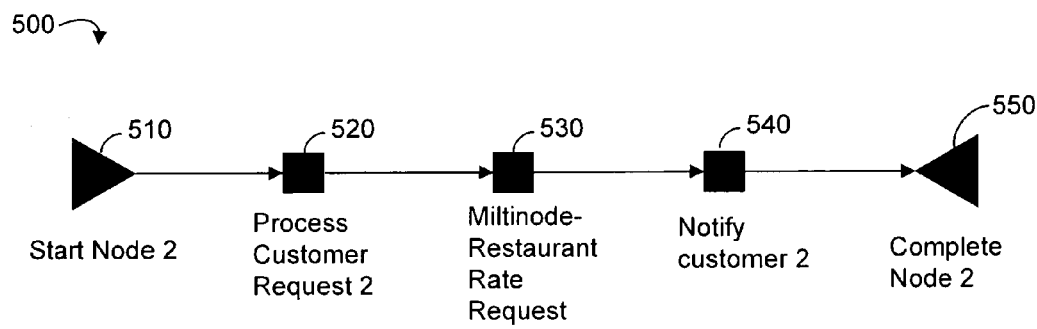
FIG. 5 is an exemplary restaurant reservation workflow in which the multinode activation by resource may be utilized and in which multinode termination in accordance with one embodiment of the present invention may be utilized.

FIG. 5 is an exemplary restaurant reservation workflow 500 in which multinode activation by resource may be utilized and in which multinode termination in accordance with one embodiment of the present invention may be utilized. The process definition 500 has a start node 510 (e.g., StartNode2), a first work node 520 (e.g., ProcessCustomerReqeust2) that processes the customer request, a multinode 530 (e.g., RestaurantRateRequest), a second work node 540 (e.g., NotifyCustomer2) that notifies the customer of the rates of the different restaurants, and a complete node 550 (e.g., CompleteNode2).

In this restaurant reservation workflow 500, all available restaurants need to be contacted for price information. It is noted that the restaurants are considered to be resources in this example. Accordingly, the multinode 530 may be activated by resource (steps 360-368 of FIG. 3).

It is further noted that termination for multinode 530 can be based upon the condition that information from all the restaurants has been received. In other words, the multinode 530 terminates when all work nodes in the multinode 530 have been completed according to one embodiment of the present invention.

Exemplary Travel Reservation Workflow

Figure 6:
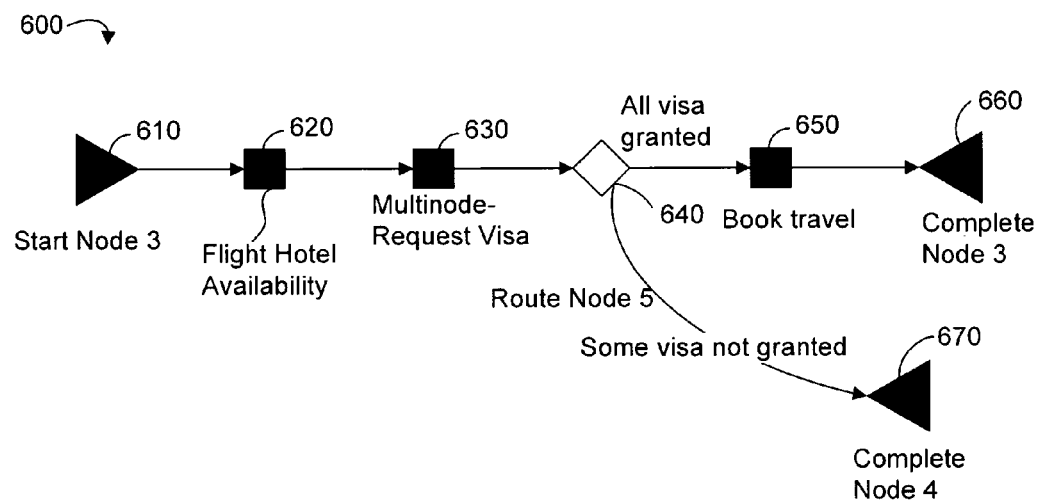
FIG. 6 is an exemplary travel reservation workflow in which the multinode activation by variable may be utilized and in which multinode termination in accordance with an alternative embodiment of the present invention may be utilized.
Figure 7:
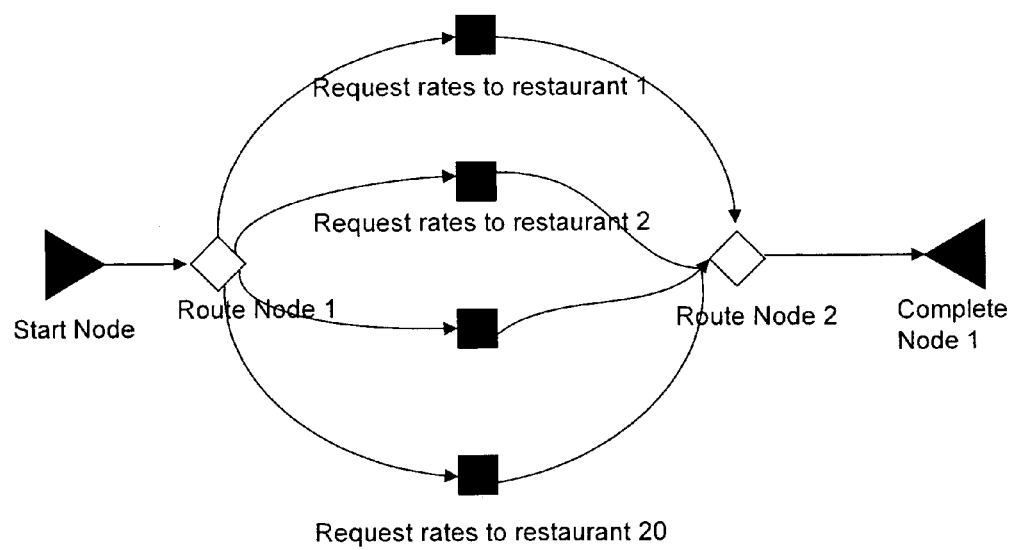
FIG. 7 illustrates an exemplary prior art process definition.

FIG. 6 is an exemplary travel reservation workflow 600 in which multinode activation by variable of the present invention may be utilized and in which multinode termination in accordance with an alternative embodiment of the present invention may be utilized.

The process definition 600 has a start node 610 (e.g., StartNode3), a first work node 620 (e.g., FlightHotelAvailability) that checks flight availability and hotel availability, a multinode 630 (e.g., RequestVisa), a route node 640 (e.g., RouteNode5), a work node 650 (e.g., BookTravel), a complete node 660 (e.g., CompleteNode3), and a complete node 670 (e.g., CompleteNode4). The route node 640 routes processing to the work node 650 (e.g., BookTravel) when all the visas are granted. The route node 640 routes processing to the complete node 670 (e.g., CompleteNode4) when some of the visas are not granted.

The multinode 630 is employed to request a visa for all tourists in a group. Accordingly, activation of the multinode 630 may be accomplished by variable since the request for visas depends on the number of tourists in the group. It is noted that the consulates that release visas to the tourists are considered to be the resources in this case. The activation cannot be based on the number of resources (i.e., consulates), since there is no correlation between the number of tourists that need visas and the number of available resources (i.e., consulates that can release visas). Instead, a variable in the workflow instance can be utilized to indicate the number of visas that need to be requested in accordance with the present invention.

With this workflow, a multinode termination condition in accordance with an alternative embodiment of the present invention may be utilized. For example, workflow execution can proceed from the multinode 630 to the route node 640 when either all the visas have been received or when at least one visa has been declined. This example illustrates a case where the multinode may be terminated even before all work nodes have been completed.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for invoking multiple parallel instances of a same node comprising the steps of:
   a) defining a multinode as a node that allows for activation of multiple parallel instances of a same work node in a workflow;
   b) during run time determining a number of work nodes to be activated in the multinode equal to a number of elements in a vector;
   c) activating the number of work nodes in the multinode;
   d) determining when the execution of the multinode is completed based on a termination rule regardless of a status of work nodes in the work flow;
   e) when the execution of the multinode is complete, executing a successor node; and
   f) when the execution of the multinode is not complete, processing continues at step c).

2. The method of claim 1 wherein a new instance of the same work node is started for the number of elements in the vector.

3. The method of claim 1 wherein determining when the execution of the multinode is completed based on said termination rule includes evaluating whether a multinode goal has been achieved, and when the multinode goal has been achieved, terminating the execution of the multinode.

4. The method of claim 1 wherein determining when the execution of the multinode is completed based on said termination rule includes determining whether all work nodes in the multinode have been completed, and when all work nodes in the multinode have been completed, terminating the execution of the multinode.

5. The method of claim 1 wherein terminating the execution of the multinode includes canceling other nodes and proceeding to a successor node.

6. The method of claim 1 further comprising the step of allowing flow to continue to said successor node when all activated work nodes in the multinode have been completed.

7. The method of claim 1 wherein the step of executing the multinode includes the step of providing each work node in the multinode with different input data for execution.

8. The method of claim 1 wherein the step of executing the multinode includes the step of providing different attributes for each work node in the multinode.

9. The method of claim 8 wherein the attributes includes one of resource selection criteria, security, exception handling criteria, and deadlines for work node execution.

10. The method of claim 1 wherein the step of determining when the execution of the multinode is completed based on said termination rule further includes the step of
    specifying multinode termination by a condition;
    checking the condition when one of the work nodes in the multinode terminates; and
    when the condition is satisfied, said successor node is activated, and other work nodes in execution within the multinode are canceled.

11. A system for processing multinode definitions comprising:
    a workflow engine for processing workflow definitions; and
    a multinode handling facility coupled to the workflow engine for processing multinodes, determining a number of multiple instances of same work nodes in one of the multinodes to be activated equal to a number of elements in a vector; activating the number of work nodes in the one of the multinodes; determining when the execution of the one of the multinodes is completed based on a termination rule; and when the execution of the one of the multinodes is complete, executing a successor node.

12. The system of claim 11 wherein the multinode handling facility further comprises
    a multinode determination unit for receiving a node definition and responsive thereto for determining whether the current node is a normal work node or one of the multinodes.

13. The system of claim 11 wherein the multinode handling facility further comprises
    an activation facility for receiving an activation rule and based thereon for determining whether activation is by resource or by variable.

14. The system of claim 13 wherein the multinode handling facility further comprises
    a resource-based activation facility coupled to the activation facility for processing activation by resources; and
    a variable-based activation facility coupled to the activation facility for processing activation by variables.

15. The system of claim 14 wherein the resource-based activation facility further comprises
    a resource rule execution unit for executing a resource rule of the one of the multinodes; and
    a new instance generation unit for starting new instances of the one of the multinodes for each new resource in the resource list.

16. The system of claim 15 wherein the resource rule is specified in a service node tag of a multinode description.

17. The system of claim 14 wherein the variable-based activation facility further comprises
    a variable name reader for reading the variable name; and
    a new instance generation unit for starting new instances of the one of the multinodes for each new element in the variable identified by the variable name.

18. The system of claim 17 wherein a variable type is one of a vector and a list.

19. The system of claim 11 wherein each node in the one of the multinodes is provided with different input data and different attributes for execution; wherein the attributes includes one of resource selection criteria, security, exception handling criteria, and deadlines for node execution.

20. A method for invoking multiple parallel instances of a same node, comprising:
 defining a multinode as a node that allows for activation of multiple parallel instances of a same work node in a workflow;
 determining, based on an activation rule, whether the activation of the multiple parallel instances of the same work node is a variable-based activation;
 reading a variable name to determine a number of the multiple parallel instances of the same work node to activate when the activation is based on the variable-based activation; and
 activating the multiple parallel instances of the same work node in the multinode equal to the number read from the variable.

21. The method of claim 20 further comprising, activating new instances of the multinode for each element in a vector when the activation is based on the variable-based activation.

22. The method of claim 20 wherein, the variable-based activation is based on a vector.

23. A method for invoking multiple parallel instances of a same node, comprising:
 defining a multinode as a node that allows for activation of multiple parallel instances of a same work node in a workflow;
 reading an activation rule to determine if activation of the multinode is based on variable-based activation;
 reading a variable name that is a vector to determine a number of plural instances of the same work node to activate when the activation rule is the variable-based activation; and
 activating the multinode to execute the number of plural instances of the same work node, wherein the number is read from the variable name.

24. The method of claim 23, wherein a new instance of the same work node is started for each element in the vector.

* * * * *

UNITED STATES PATENT AND TRADEMARK OFFICE
CERTIFICATE OF CORRECTION

PATENT NO. : 7,228,328 B2  Page 1 of 1
APPLICATION NO. : 09/872581
DATED : June 5, 2007
INVENTOR(S) : Fabio Casati et al.

It is certified that error appears in the above-identified patent and that said Letters Patent is hereby corrected as shown below:

On sheet 1 of 6, in Fig. 1, above "Process Def", delete "00" and insert -- 100 --, therefor.

Signed and Sealed this

Twenty-eighth Day of April, 2009

JOHN DOLL
*Acting Director of the United States Patent and Trademark Office*